Jan. 17, 1961 A. J. IMMESOETE 2,968,265
CLUTCH CONTROL MECHANISM
Filed March 27, 1957 2 Sheets-Sheet 1
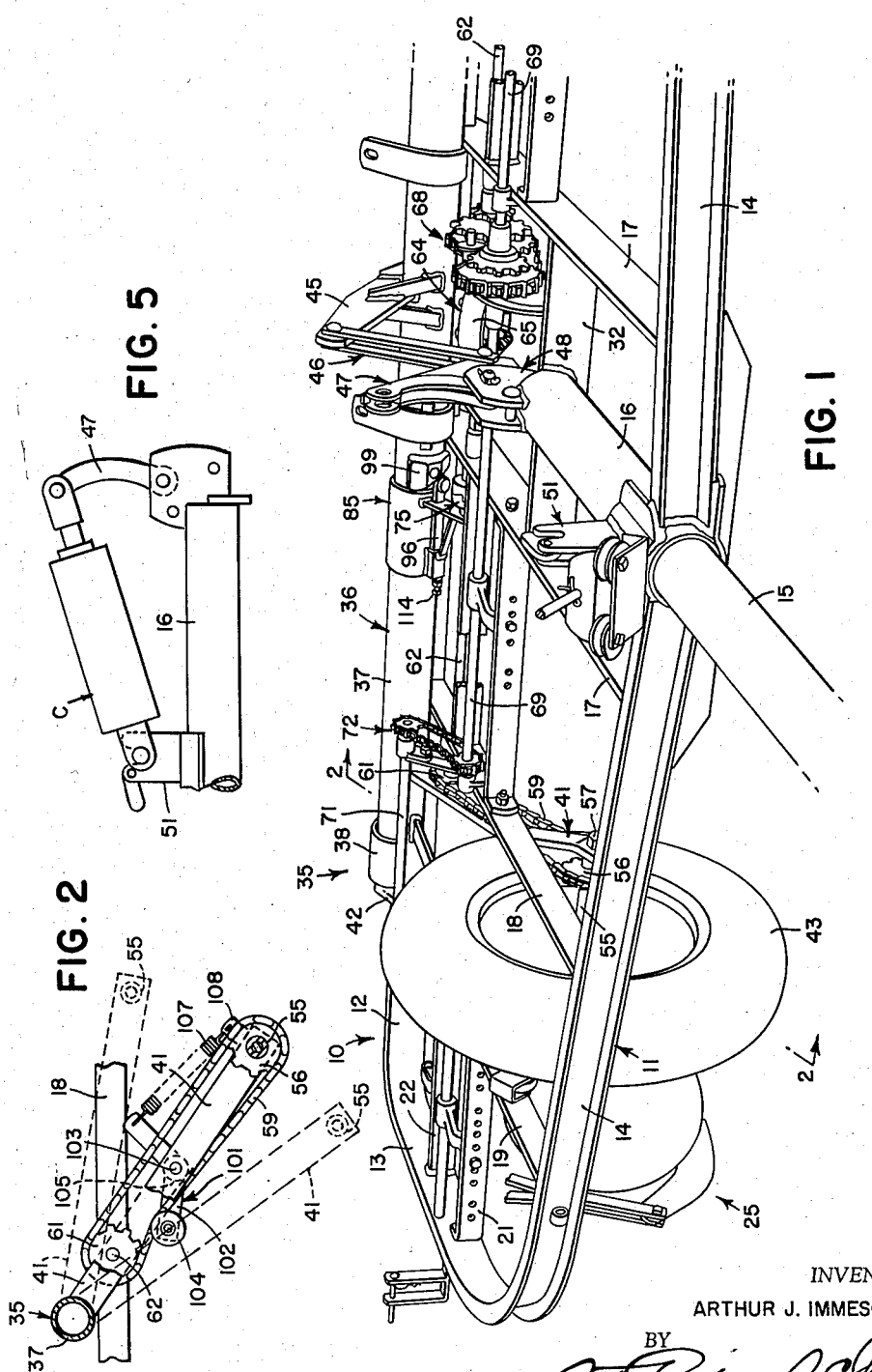
INVENTOR.
ARTHUR J. IMMESOETE
BY
ATTORNEYS Jan. 17, 1961   A. J. IMMESOETE   2,968,265
CLUTCH CONTROL MECHANISM Filed March 27, 1957   2 Sheets-Sheet 2

INVENTOR.
ARTHUR J. IMMESOETE
BY
C. T. Parker R. C. Johnson
ATTORNEYS

2,968,265
CLUTCH CONTROL MECHANISM

Arthur J. Immesoete, Moline, Ill., assignor, by mesne assignments, to Deere & Company, a corporation of Delaware Filed Mar. 27, 1957, Ser. No. 648,887

14 Claims. (Cl. 111—67)

The present invention relates generally to agricultural implements and more particularly to implements of the type that are supported by ground wheels by which the implements are raised and lowered into and out of transport and working positions.

The object and general nature of this invention is the provision of a new and improved clutch and clutch operating means whereby the driven mechanism of the implement is controlled by the rocking of the wheel frame when the latter is shifted to raise and lower the implement. More particularly, it is a feature of this invention to provide an axially shiftable member carried directly on the rockshaft section of the wheel frame, which member is actuated by rocking of the rockshaft for engaging and disengaging the clutch.

Further, it is a feature of this invention to provide new and improved drive means for transmitting the drive from one of the ground wheels through the clutch to the mechanism of the implement, the drive means being so constructed and arranged that the operating parts have substantially no undesired looseness not only in the operating position but also in their transport position. More specifically, according to this invention, the drive means from the ground wheel to the implement mechanism includes chain and sprocket means disposed adjacent the wheel-carrying arm of the wheel frame and so constructed and arranged that, although the drive transmitting means is not disposed on the axis of rocking of the wheel frame, the chain and sprocket means is maintained in taut condition in the driving position, or operating position, as well as in the transport position. Thus, accurate operation is secured in the working position and in the transport position the drive parts are held against rattling, displacement and the like, even though the implement may be transported at relatively high speeds over rough terrain.

These and other objects and advantages of this invention will be apparent to those skilled in the art after a consideration of the following detailed description taken in conjunction with the accompanying drawings, in which:

Fig. 1 is a fragmentary perspective view of the right hand portion of an implement in which the principles of this invention have been incorporated.

Fig. 2 is a fragmentary sectional view taken generally along the line 2—2 of Fig. 1 and partly diagrammatic in character, illustrating the means whereby the drive chain is kept tight both in the operation position and in the transport position of the implement.

Fig. 5 is a fragmentary view showing the power cylinder for actuating the wheel frame.

Figure 3:
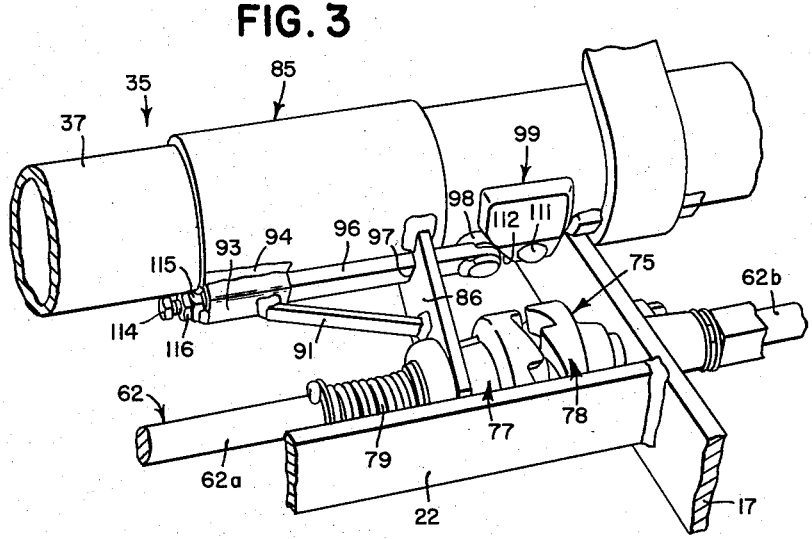
Fig. 3 is an enlarged fragmentary perspective view of the clutch and clutch actuating means incorporated in the implement shown in Fig. 1.

Referring first to Fig. 1, the implement in which the principles of this invention have been incorporated is shown as a planter, indicated in its entirety by the reference numeral 10. The planter includes a main frame 11 that is made up of a rear bar section 12, end sections 13, and generally forward and laterally and inwardly directed frame sections 14. Generally, the sections 12, 13 and 14 comprise a channel member bent to the configuration shown, with the inner adjacent portions of the end sections 14 secured, as by welding or the like, to a short sleeve 16 that receives the rear end of a draft or hitch member that preferably is in the form of a pipe 15. The frame 11 is completed by a plurality of fore-and-aft extending bars 17, 18 and 19, and other laterally extending bars 21 and 22, all bolted or welded together to form a rigid framework. Mounted on each set of transverse bars 21 and 22 is a furrow opener unit 25 and an associated seed hopper, not shown, the latter also containing suitable seed dispensing mechanism. The rear end of the draft pipe 15 is removably disposed in the sleeve 16 and the latter is secured, as by welding, to a cross bar 32, as shown in Fig. 1.

The frame 11 and associated parts are supported on a wheel carrier unit 35. This unit includes a wheel frame 36 that is made up of a generally transversely disposed pipe member 37, forming a rockshaft, that is journaled for rocking movement in a plurality of bearing brackets, one of which is indicated at 38 in Fig. 1. These brackets are carried by the rear bar section 12 of the frame 11. A pair of inner and outer arms 41 and 42 are fixed to each end of the rockshaft 37 and at their outer ends rotatably receive a ground wheel 43. An arm 45 is fixed to the generally central portion of the rockshaft 37 and is connected by a link 46 with an arm 47 that is journaled in the bracket 48 carried at the rear end of the sleeve member 16. The latter member also carries a forward bracket 51, and a power cylinder C, Fig. 5, is adapted to be connected between the bracket 51 and the upper end of the arm 47, whereby the power cylinder serves as means for rocking the wheel frame for raising and lowering the main frame 11 and associated parts. Movement of the wheel frame 36 relative to the main frame 11 is made use of, according to the present invention, for controlling the seeding and/or other mechanism as will now be described.

The seed dispensing mechanism mentioned above is of any suitable and well-known construction, and hence has not been illustrated. This seeding mechanism is driven from the ground wheels 43. Fig. 1 shows only one of the ground wheels, but it will be understood that the ground wheel unit 35 and the frame 36 is symmetrical as between right and left hand portions.

Each ground wheel 43 is connected to rotate a wheel shaft 55 on which a sprocket 56 is fixed, the shaft 55 preferably being tubular and mounted for rotation on a stationary part 57 carried by the lower and forward ends of the arms 41 and 42, the upper or rear portions of which are fixed, as by welding, to the rockshaft 37. A sprocket chain 59 is trained over the sprocket 56 and over an associated sprocket 61 that is fixed to a shaft 62 supported in any suitable way by bearing means carried by the bars 17 and 18. There is a shaft 62 at each side of the machine, and each shaft serves as the drive shaft for the associated seed dispensing means. The inner end of each of these drive shafts extends into a differential unit 64 that is constructed substantially like and functions substantially the same as the differential unit incorporated in the ground wheel actuated drive mechanism shown and claimed in the U.S. patent to White 2,376,464, which issued May 22, 1945. Briefly, such differential unit 64 includes a yoke 65 having tubular portions rotatably receiving the inner ends of the drive shafts 62. Since a ground wheel 43 drives each of the shafts 62, the differential unit 64, particularly the yoke section 65 thereof, is driven differentially from the shafts 62 and is connected through ratio changing means 68 to drive a drill shaft 69, the latter being connected to drive all of the seed dispensing mechanisms of the planter. When the implement is a four-row machine, the drill shaft 69 serves to drive the two laterally inner dispensing units while the laterally outer dispensing units, which are disposed laterally outward of the associated ground wheels 43, is driven from the drill shaft 69 through a counter shaft 71 that is connected to receive the drive from the drill shaft 69 through sprocket and chain means 72.

According to the principles of this invention, the drive from the ground wheels 43 to the ratio changing unit 68 is controlled by means of a clutch 75 that is carried by the right hand drive shaft 62, which is mounted in the frame 11 generally parallel to and relatively closely adjacent the rockshaft 37 of the wheel frame 36. To accommodate the clutch 75, the right hand drive shaft 62 is divided into two sections 62a and 62b (Figs. 3 and 4), the clutch 75 being disposed between the shaft sections 62a and 62b. The clutch 75 per se is of generally conventional construction, incorporating a first clutch member 77 slidably but non-rotatably connected with the laterally inner end of the shaft section 62a, and a second clutch member 78 that is fixed to the laterally outer end of the inner drive shaft section 62b. The clutch members 77 and 78 are provided with interengageable lugs or teeth, and the slidable clutch member 77 is urged by a spring 79, carried by the shaft section 62a and reacting against a washer or abutment 81, to move along the drive shaft section 62a toward a position interengaged with the companion clutch member 78, whereby the right hand drive wheel which drives the shaft section 62a is adapted to rotate the inner shaft section 62b. The rotation of the left hand ground wheel (not shown) drives the left hand shaft 62 so that the seed dispensing mechanism receives power from both drive wheels. However, if the clutch 75 is disengaged, then neither wheel can deliver power to the seed dispensing mechanism since the gears within the differential unit 64 rotate idly.

The means for controlling the clutch 75 from the rocking of the rockshaft 37 will now be described. Slidably mounted on the rockshaft 37 is a sleeve member 85 and secured to this member is an arm 86 that at its rear end is welded to the sleeve member 85 and at its forward end is bifurcated and is disposed between a pair of associated portions 88 and 89 of the clutch member 77. Thus, through the arm 86, the sleeve member 85 is also slidably mounted on the drive shaft and the latter, acting through the arm 86, holds the sleeve member 85 from rotating with the rockshaft 37 when the latter is rocked. The arm 86 is reenforced by a brace 91, one end of the brace 91 being welded to the arm 86 while the other end is welded to a channel-like part 93 that itself is welded, as at 94, to the sleeve member 85. The channel member 93 slidably receives one end of a bar 96 that extends through a notch 97 formed in the inner end of the arm 86, as best shown in Fig. 3. The laterally inner end of the bar 96 carries a cam roller 98 that engages an abutment or cam member 99 secured rigidly, as by a bolt 111, to the rockshaft 37. The cam surface of the member 99 is shown at 112 in Figs. 3 and 4. The position of the bar 96 relative to the member 85 is adjusted by means of a set screw 114 threaded into a nut member 115 that is welded to the laterally outer ends of the channel 93. A lock nut 116 serves to hold the set screw 115 in position. As can best be seen in Fig. 4, the inner end of the set screw 114 abuts directly against the laterally outer end of the bar 96.

The operation of the mechanism so far described is substantially as follows.

Figure 4:
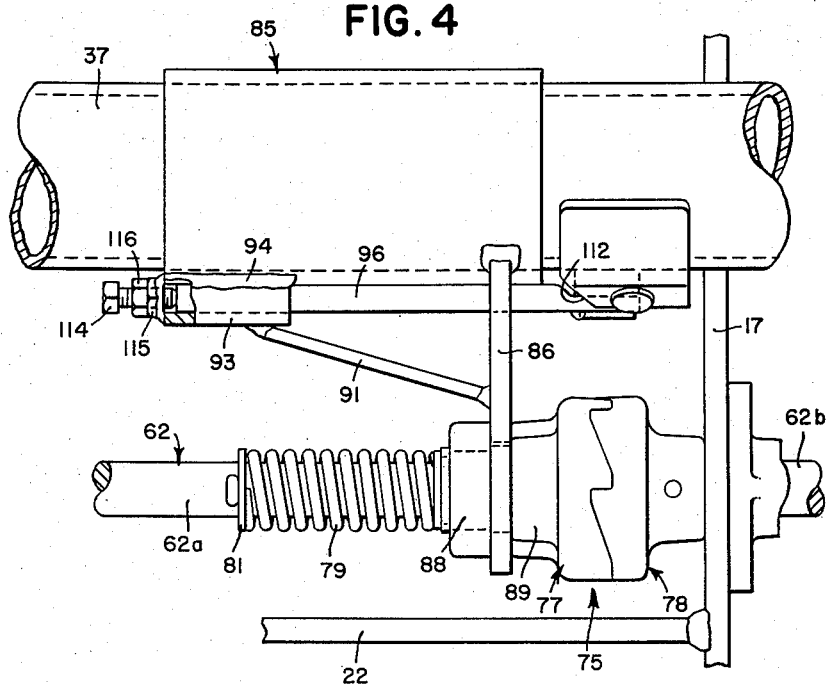
Fig. 4 is a plan view of the structure shown in Fig. 3.

The wheel frame unit 35 as shown in Fig. 1 is generally midway between the lowermost or transport position of the ground wheels 43 and the uppermost or operating position. In this position of the parts, the cam member 99 is moved around to a point where it is starting to act on the bar 96 to shift the latter and the sleeve member 85 to the left as viewed in Fig. 1. It will be understood that the engagement of the bifurcated portion of the arm 86 with the clutch part 77 on the drive shaft 62 serves to prevent the sleeve member 85 from rotating with the rockshaft 37. The cam member 99 acts against the bar 96, and the latter, acting through the set screw 114 which it abuts, acts to shift the member 85 along the rockshaft 37. This movement of the sleeve 85 also carries with it the arm 86 to the left and moves the clutch member 77, as shown in Fig. 4, against the action of the spring 79 and at the completion of the raising movement of the wheel frame 35 the clutch member 77 is moved entirely away from the companion clutch member 78, as shown in Fig. 3. To insure that the clutch members will be entirely disengaged when the frame is raised relative to the ground by swinging the wheel frame downwardly, the lock nut 116 may be loosened and the set screw 114 adjusted to insure separation of the clutch members 77 and 78. As soon as the clutch members separate, all parts of the dispensing mechanism and the drives therefor stop except the drive shaft sections 62a and 62b, the other drive shaft 62 and the differential gears and pinion gears in the unit 64. Thus, by virtue of this particular clutch arrangement, when the implement is transported, there is a minimum of parts that continue to move. This results in reduced wear, especially as compared with other implements in which a large number of gears, chains and the like are driven during transport, and even though they are not under load, such constant movement causes a substantial amount of wear that is unnecessary.

The lowered or transport position is shown in broken lines in Fig. 2 and from this figure it will be seen that the axis of the adjacent drive shaft 62 is located slightly above a straight line connecting the axis of the rockshaft 37 and the axis of the associated wheel shaft 55. In this position of the wheel frame unit, the associated drive chains 59 are substantially taut. Hence, there is little likelihood that either of the chains 59 will be thrown off either of the sprockets 56 and 61 no matter how rough the terrain over which the implement is drawn in transport. Substantially the same relationship exists when the wheel frame is raised so as to lower the implement into working position, the corresponding positions of the wheels 43 and associated parts are indicated more or less fragmentarily in dotted lines in Fig. 2. In this position the axis of the drive shaft 62 is now below a line connecting the axis of the rockshaft 27 with the axis of the wheel shaft 55 but again the chain 59 will be held taut. Thus, in the operating position there is substantially no likelihood that the chain 59 will become displaced from the associated sprockets even when planting at high speeds. The chain 59 will be slightly loose as the wheel frame swings through a position about midway of its end positions, shown in full lines in Fig. 2, but this is only a momentary occurrence and to take care of retaining the chain 59 in place a chain tightener 101 is provided. Preferably, the chain tightener consists of an arm 102 pivoted at 103 to the wheel arm 41, and the arm 102 carries two idlers 104 and 105 the latter being located on the pivot 103. A spring 107 is connected between the lower end of the arm 102 and a bracket 108 fixed to the associated wheel arm 41. The idler unit 101 functions chiefly when the wheel frame is swung through its midway position, but to keep the chain 59 taut in both the operating position as well as in the transport position the idler 101 is not relied upon. Instead, the chains 59 are kept taut in the end positions of the wheel frame by virtue of the spatial relations, described above, between the axes of the parts 37, 55 and 62.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In an agricultural implement, a main frame, a wheel frame swingably connected with said main frame and including rockshaft means journaled on said main frame, means connected with said wheel frame to rock said rockshaft, a drive shaft journaled on said main frame adjacent said rockshaft, means connected with said drive shaft to drive the latter, a disconnect clutch carried by said drive shaft, a member slidably mounted on said rockshaft and said drive shaft, means on said rockshaft for shifting said slidable member in one direction when the wheel frame and said rockshaft is rocked in one direction, and means connecting said slidable member with said clutch.

2. In an agricultural implement, a main frame, rockshaft means journaled on said main frame, means to rock said rockshaft, a drive shaft journaled on said main frame adjacent said rockshaft, means to drive said drive shaft, a disconnect clutch carried by said drive shaft, a member slidably mounted on said rockshaft, means holding said slidable member against rotation with said rockshaft, means on said rockshaft for shifting said slidable member in one direction when said rockshaft is rocked in one direction, and the means holding said slidable member against rotation including an arm connecting said slidable member with said clutch.

3. In an agricultural implement, a main frame, a wheel frame swingably connected with said main frame and including rockshaft means journaled on said main frame, means to rock said rockshaft and wheel frame, a drive shaft journaled on said main frame adjacent said rockshaft, means to drive said drive shaft, a disconnect clutch carried by said drive shaft and including separable parts, one of which is shiftable generally longitudinally of said drive shaft, a member slidably mounted on said rockshaft and including means engaged with said longitudinally movable part, said last mentioned means including an arm holding said slidable member against rotation with said rockshaft, and means on said rockshaft for shifting said slidable member and said arm in a direction to disconnect said parts when said rockshaft is rocked in one direction.

4. In an agricultural implement, a main frame, a wheel frame swingably connected with said main frame and including rockshaft means journaled on said main frame, means connected with the rockshaft to rock the latter and said wheel frame, a drive shaft journaled on said main frame adjacent said rockshaft and parallel thereto, means connected with said drive shaft to drive the latter, a disconnect clutch carried by said drive shaft, a member slidably mounted on said rockshaft, means acting between said rockshaft and said slidable member for shifting the latter axially in response to rocking movement of said rockshaft, said clutch including separable parts, one of which is shiftable generally longitudinally of said drive shaft and means connecting said slidable member with the shiftable part of said clutch.

5. In an agricultural implement, a main frame, a part swingably connected with said main frame and including rockshaft means journaled on said main frame, means connected with said rockshaft to rock the latter, a member slidably mounted on said rockshaft, means connected with said slidable member to hold the latter against rotation with said rockshaft while accommodating axial movement of said sleeve member, and cam means on said sleeve member and rockshaft for moving said sleeve member axially along said rockshaft.

6. The invention as set forth in claim 5, further characterized by said cam means including an angled part on said rockshaft and a cooperating part adjustable relative to said sleeve member.

7. In an agricultural implement, a main frame, a part swingably connected with said main frame and including rockshaft means journaled on said main frame, means connected to rock said rockshaft, a drive shaft journaled on said main frame adjacent said rockshaft, means connected to drive said drive shaft, a disconnect clutch carried by said drive shaft and including a part shiftable along the drive shaft to operate the clutch, a second member connected with said shiftable part, and a cam on said rockshaft engageable with said second member to shift said shiftable part when said rockshaft is rocked in one direction.

8. The invention set forth in claim 7, further characterized by means adjustably connecting said member to said part.

9. In an agricultural implement, a main frame, rockshaft means journaled on said main frame, means connected to rock said rockshaft means, a drive shaft journaled on said main frame adjacent said rockshaft, means connected to drive said drive shaft, a member slidable on said rockshaft means, a disconnect clutch carried by said drive shaft, means holding said member against rotation with said rockshaft, said member including a part shiftable along the drive shaft to operate the clutch, a cam on said rockshaft, a spring encircling said drive shaft and engageable with said shiftable part, and acting to urge the latter and said slidable member in a direction toward said cam, and means on said slidable member and engaged by said cam so that upon movement of said rockshaft and cam in one direction, said slidable member and part are moved against said spring so as to disconnect said clutch.

10. In an agricultural implement, a main frame, a wheel frame swingably connected with said main frame and including rockshaft means journaled on said main frame and rockable relative thereto about an axis, and wheel arm means fixed to the end portions of said rockshaft means, ground wheels carried at the outer end portions of said wheel arms, a drive shaft journaled on said main frame parallel to and in spaced relation with respect to said rockshaft and extending at one end to a point adjacent the plane of said wheel arm means, the axis of said drive shaft lying between the axis of said rockshaft and the axis of said ground wheels, a first sprocket on the end of said drive shaft, a second sprocket mounted on said wheel arm means and having a chain connection with said first sprocket, and means connected with said rockshaft to swing said wheel arm means between upper and lower positions relative to said main frame, said drive shaft and first sprocket being located on the main frame generally adjacent said wheel arm means and in a straight line extending from said second sprocket to the axis of said rockshaft when said wheel arm means is in an intermediate position.

11. In an agricultural implement or the like, a main frame, a wheel frame swingable relative thereto about an axis and including an arm swingable therewith between two end positions, a wheel carried on said arm and swingable therewith, a driving member on said wheel, a shaft on said frame having one end adjacent the path of movement of said arm and also adjacent the axis of swinging of said wheel frame, said shaft being disposed parallel to but spaced from said axis in a direction generally toward said driving member, a driven member on said end of said shaft, and a flexible element trained around said members to transmit driving force from one to the other in different positions of said wheel frame, said shaft being located on the main frame so as to dispose said driven member adjacent said arm and at a point about half way between the end positions thereof.

12. In an agricultural implement or the like, a main frame, a wheel frame swingably connected with the main frame and including wheel-carrying arms for raising and lowering the main frame into and out of transport and working positions, a drive shaft carried by the main frame and having an end disposed generally between the axis of swinging of said wheel frame and the associated wheel, and a sprocket and chain connection between said shaft end and the associated wheel, whereby said connection is substantially taut in both the transport position and the working position of said wheel frame, said shaft being so located on said main frame that said shaft end lies generally in a line between the axis of said wheel and the axis of swinging of said wheel frame in the position of the latter substantially midway between its raised and lowered positions.

13. In an agricultural implement, a main frame, rockshaft means journaled on said main frame, means to rock said rockshaft, a drive shaft journaled on said main frame adjacent said rockshaft, means to drive said drive shaft, a disconnect clutch carried by said drive shaft, a member slidably mounted on said rockshaft, means holding said slidable member against rotation with said rockshaft, means on said rockshaft for shifting said slidable member in one direction when said rockshaft is rocked in one direction, and an arm connecting said slidable member with said clutch.

14. In an agricultural implement, a main frame, a wheel frame swingably connected with said main frame and including rockshaft means journaled on said main frame, means to rock said rockshaft and wheel frame, a drive shaft journaled on said main frame adjacent said rockshaft, means to drive said drive shaft, a disconnect clutch carried by said drive shaft and including separable parts, one of which is shiftable generally longitudinally of said drive shaft, a member slidably mounted on said rockshaft and including means engaged with said longitudinally movable part, an arm holding said slidable member against rotation with said rockshaft, and means on said rockshaft for shifting said slidable member and said arm in a direction to disconnect said parts when said rockshaft is rocked in one direction.

References Cited in the file of this patent

UNITED STATES PATENTS

| | | |
|---|---|---|
| 251,089 | Black | Dec. 20, 1881 |
| 1,319,854 | Dickinson | Oct. 28, 1919 |
| 1,640,625 | Strandlund | Aug. 20, 1927 |
| 2,310,602 | Silver | Feb. 9, 1943 |
| 2,561,235 | Schmutzler | May 23, 1946 |
| 2,685,356 | Bjerkan | Aug. 3, 1954 |
| 2,695,576 | Starr | Nov. 30, 1954 |